① United States Patent  (10) Patent No.: US 7,746,428 B2
Kobayashi et al.  (45) Date of Patent: Jun. 29, 2010

(54) LIQUID CRYSTAL DISPLAY ELEMENT

(75) Inventors: Setsuo Kobayashi, Mobara (JP);
Hiroaki Miwa, Yokohama (JP);
Katsuhiko Ishii, Chosei (JP); Takashi Yamamoto, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 338 days.

(21) Appl. No.: 11/797,191

(22) Filed: May 1, 2007

(65) Prior Publication Data
US 2007/0263159 A1 Nov. 15, 2007

(30) Foreign Application Priority Data
May 10, 2006 (JP) .............................. 2006-131569

(51) Int. Cl.
*G02F 1/1333* (2006.01)
*G02F 1/1339* (2006.01)
(52) U.S. Cl. ....................................... 349/110; 349/190
(58) Field of Classification Search .................. None
See application file for complete search history.

(56) References Cited
U.S. PATENT DOCUMENTS
5,432,626 A 7/1995 Sasuga et al.
2002/0191131 A1* 12/2002 Ota et al. .................... 349/110
2003/0035081 A1* 2/2003 Jung et al. ................... 349/152
2004/0075801 A1 4/2004 Choi et al.
2004/0246430 A1* 12/2004 Shih ........................... 349/153
2005/0151899 A1 7/2005 Chou et al.
2005/0237466 A1* 10/2005 Chung et al. ................ 349/143
2005/0286010 A1* 12/2005 Park et al. ................... 349/199

FOREIGN PATENT DOCUMENTS
CN 1400494 A 7/2002
JP 4-342229 5/1991
JP 5-72540 9/1991
JP 11-352500 6/1998
JP 2003-043462 7/2001

* cited by examiner

*Primary Examiner*—Tina M Wong
(74) *Attorney, Agent, or Firm*—Stites & Harbison, PLLC; Juan Carlos A. Marquez, Esq

(57) ABSTRACT

In manufacturing a liquid crystal display element which includes a black matrix, in curing an ultraviolet curing sealing material after filling liquid crystal using a dropping injection method, there has been a possibility that a radiation quantity of ultraviolet rays to the sealing material is insufficient and hence, the curing is not sufficiently performed thus largely lowering the reliability of the liquid crystal display element. According to the present invention, an overlapping width of a frame-like sealing material and a black matrix on a peripheral portion along a display region is suppressed to 0.2 mm or less, or a region of the black matrix which is overlapped to the frame-like sealing member is patterned to include a light transmitting portion.

10 Claims, 9 Drawing Sheets

LIQUID CRYSTAL DISPLAY ELEMENT

CROSS-REFERENCE TO RELATED APPLICATIONS

The disclosure of Japanese Patent Application No. 2006-131569 filed on May 10, 2006 including the specification, drawings and abstract is incorporated herein by reference in its entirety.

BACKGROUND

1. Field of the Invention

The present invention relates to a liquid crystal display element in which a pair of substrates is arranged to face each other and is fixed to each other by way of a frame-like sealing member with a predetermined gap therebetween and liquid crystal is sealed between both substrates inside the frame-like sealing member, and more particularly to a liquid crystal display element including a black matrix which surrounds a group consisting of a large number of display pixels which are formed inside the frame-like sealing member and provides along the frame-like sealing member.

2. Description of the Related Arts

In the active-matrix-type liquid crystal display element which constitutes one type of the liquid crystal display element, a switching element is provided to each of the plurality of pixels arranged in a matrix array. A thin film transistor (TFT) is used as a typical example of the switching element.

Here, the active-matrix-type liquid crystal display element which uses the thin film transistor is known in patent document 1 (U.S. Pat. No. 5,432,626), for example. Further, the constitution which covers a periphery of the pixel electrode with a light blocking film made of a resin (hereinafter also referred to as a black matrix) is known in patent document 2 (Japanese Patent Laid-open Hei04-342229), patent document 3 (Japanese Patent Laid-open Hei05-72540) and patent document 4 (Japanese Patent Laid-open Hei11-352500).

The liquid crystal display element is, for example, configured such that a pair of substrates which respectively forms display pixel electrodes and orientation films and the like on inner surfaces thereof in a stacked manner allows the inner surfaces thereof to be arranged to face each other with a predetermined gap therebetween, peripheral portions of the pair of substrates are adhered to each other by a frame-like sealing material which forms a cutout portion in a portion thereof as a liquid crystal filling port, then, liquid crystal is filled in a space defined inside the sealing material by a pressure reduction injection method through the liquid crystal filling port and, thereafter, the liquid crystal filling port is sealed.

Further, polarizers are adhered to outsides of both substrates and, at the same time, a backlight which supplies light to the liquid crystal display element is arranged below the liquid crystal display element, and a drive circuit board which drives the liquid crystal display element is arranged outside an outer peripheral portion of the liquid crystal display element, and these respective members and a frame-like body formed of a molded product for holding these respective members are housed in a metal-made shield case (frame) in which a liquid crystal display window is formed.

SUMMARY

Recently, the liquid crystal display elements have been remarkably popularly used in miniaturized portable equipment such as mobile phones. On the other hand, along with the increase of the popular use of the liquid crystal display elements, a demand for the low-cost manufacture of the liquid crystal display elements is steadily becoming strict. To satisfy such a demand, for the purpose of shortening an injection step, Japanese Patent No. 3210109 proposes a dropping injection method in place of the above-mentioned pressure reduction injection method (also referred to as vacuum injection method). However, in this case, as the sealing material, a heat-curing sealing material cannot be used and only an ultraviolet-curing sealing material can be used.

On the other hand, in the liquid crystal display element, as disclosed in the above-mentioned patent documents 1 to 4, the black matrix is arranged to surround each pixel electrode to clarify a profile of each pixel so as to enhance a contrast and, at the same time, the black matrix is arranged on a substrate peripheral region of the liquid crystal display element on which the frame-like sealing material is arranged thus preventing light from the above-mentioned backlight from passing the sealing material on the substrate peripheral portion of the liquid crystal display element and leaking to a display screen side. When leaking of light occurs, a display contrast is lowered on the peripheral portion of the display screen thus remarkably deteriorating a display quality. Particularly, in displaying bright characters, figures and the like on the dark display screen, there arises a drawback that the display is largely influenced by the leaking of light.

However, when the black matrix is formed on the substrate peripheral region of the liquid crystal display element where the frame-like sealing material is arranged, a radiation quantity of ultraviolet rays to the ultraviolet-curing sealing material which is used in the above-mentioned dropping injection method becomes insufficient and hence, the curing of the ultraviolet-curing sealing material is not sufficiently performed thus giving rise to a drawback that the reliability of the liquid crystal display element is largely lowered.

Accordingly, it is an object of the present invention to provide a liquid crystal display element which can adopt a dropping injection method which can shorten manufacturing steps in filling liquid crystal without lowering a display quality and lowering the reliability of the liquid crystal display element.

The above-mentioned and other objects and novel features of the present invention will become apparent by the description of this specification and attached drawings.

To briefly explain typical inventions among the inventions described in this specification, they are as follows.

(1) In a liquid crystal display element which includes a first transparent substrate, a second substrate which faces the first transparent substrate in an opposed manner by way of a predetermined gap therebetween, a frame-like sealing material which is made of an ultraviolet curing material and is sandwiched between the first substrate and the second substrate, a liquid crystal composition sealed in a space defined inside the frame-like sealing material, a plurality of display pixels which are formed between the first substrate and the second substrate by a plurality of electrodes which are formed on at least one of the first substrate and the second substrate, and a black matrix which defines respective profiles of the plurality of display pixels and, at the same time, is made of a light blocking material which is formed to surround a display region formed of the plurality of display pixels, an overlapping width of the frame-like sealing material and the black matrix on a peripheral portion along the display region is equal to less than 0.2 mm.

(2) In the liquid crystal display element having the constitution (1), optical density of an ultraviolet curing material which forms the frame-like sealing material before curing is 2 or more.

(3) In the liquid crystal display element having the constitution (2), optical density of an ultraviolet curing material which forms the frame-like sealing material before curing is 4 or less.

(4) In a liquid crystal display element which includes a first transparent substrate, a second substrate which faces the first transparent substrate in an opposed manner by way of a predetermined gap therebetween, a frame-like sealing material which is made of an ultraviolet curing material and is sandwiched between the first substrate and the second substrate, a liquid crystal composition sealed in a space defined inside the frame-like sealing material, a plurality of display pixels which are formed between the first substrate and the second substrate by a plurality of electrodes which are formed on at least one of the first substrate and the second substrate, and a black matrix which defines respective profiles of the plurality of display pixels and, at the same time, is made of a light blocking material which is formed to surround a display region formed of the plurality of display pixels, a region of the black matrix which is overlapped to the frame-like sealing material is patterned to include a light transmitting portion.

(5) In the liquid crystal display element having the constitution (4), the region of the black matrix which is overlapped to the frame-like sealing material is formed in a grid pattern extending in the horizontal direction as well as in the vertical direction.

(6) In the liquid crystal display element having the constitution (4), the region of the black matrix which is overlapped to the frame-like sealing material is formed in a grid pattern inclined from the horizontal direction and the vertical direction.

(7) In the liquid crystal display element having the constitution (4), the region of the black matrix which is overlapped to the frame-like sealing material is formed in a stripe pattern.

(8) In the liquid crystal display element having the constitution (4), the region of the black matrix which is overlapped to the frame-like sealing material is formed in an opening pattern.

(9) In the liquid crystal display element having the constitution (4), the region of the black matrix which is overlapped to the frame-like sealing material is formed in an island pattern.

(10) In the liquid crystal display element having the constitution (4), the region of the black matrix which is overlapped to the frame-like sealing material is formed in a wedge pattern.

According to the present invention, in filling the liquid crystal in the inside of a cell which is formed by the pair of substrates which face each other and the frame-like sealing material which is sandwiched between the peripheral portions of the pair of substrates, it is possible to adopt a dropping injection method which can shorten a filling step and, at the same time, it is possible to ensure a display quality and the reliability of the liquid crystal display element.

DETAILED DESCRIPTION OF THE INVENTION

Figure 1:
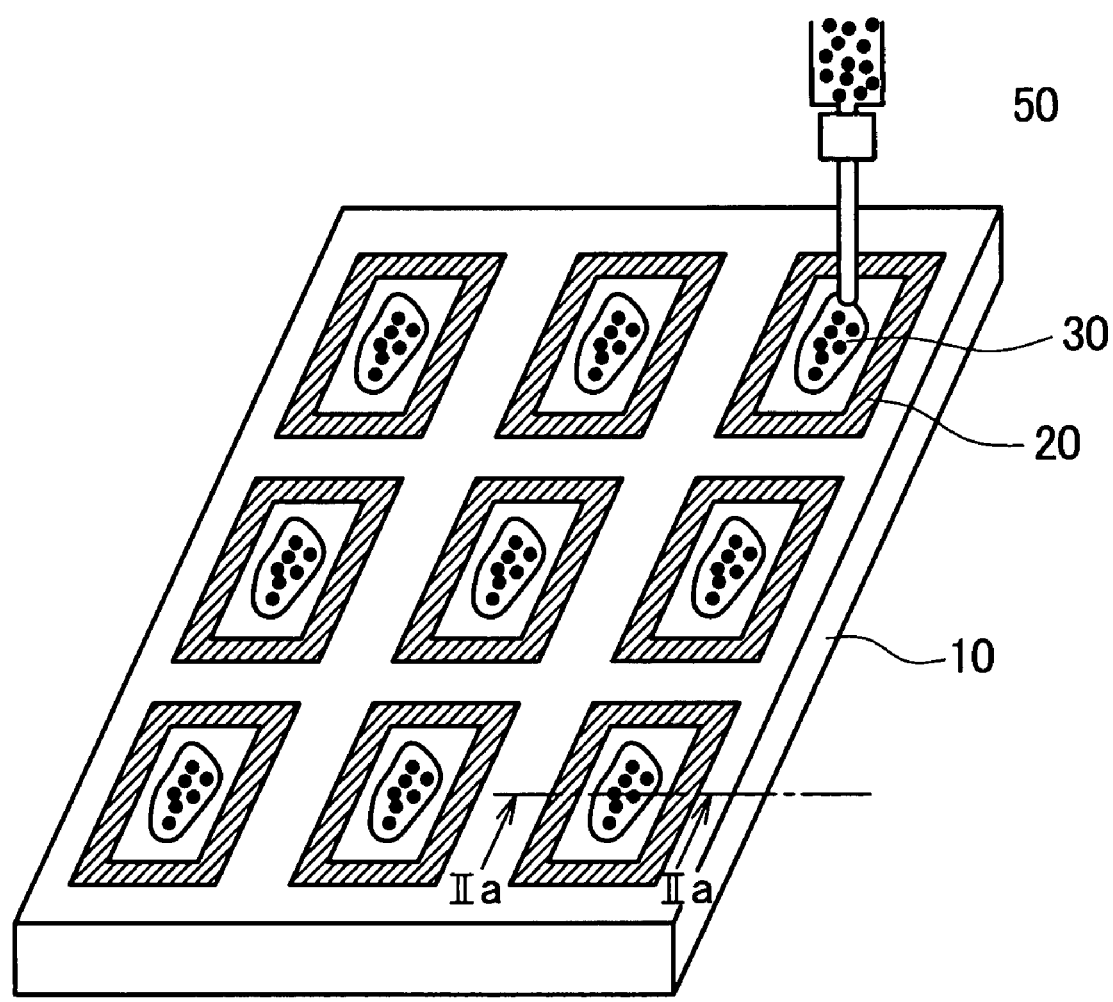
FIG. 1 is a perspective view for explaining dropping of liquid crystal to be sealed in a liquid crystal display element which uses a frame-like ultraviolet curing sealing material.

Hereinafter, embodiments according to the present invention are explained in detail in conjunction with drawings. Here, in all drawings explaining the embodiments, parts having identical functions are given the same symbol and their repeated explanation is omitted.

Here, with respect to the drawings attached to the specification, for the sake of brevity, the illustration of elements such as substrates, electrodes, electronic elements, electric lines and external lead electrode terminals from the electric lines formed on the substrates may be omitted. Further, for the sake of clarity, the respective elements in the drawing are drawn in exaggeration using a magnification different from a magnification of an actual display elements and device.

Prior to the explanation of the embodiments according to the present invention, a method for sealing liquid crystal in a liquid crystal display element using an ultraviolet-curing sealing material by a dropping injection method is explained briefly in accordance with the above-mentioned Japanese Patent No. 3210109. FIG. 1 is, for example, a perspective view of one sheet of substrate 10 for forming nine liquid crystal display elements for a small-sized portable equipment such as a mobile phone thereon. Frame-like sealing materials 20 are formed on the substrate 10. Here, in the actual constitution, in the inside of each frame-like sealing material 20, a plurality of pixel electrodes, switching elements provided for respective pixel electrodes, lines which are electrically connected to the pixel electrodes and the switching elements and an orientation film which orients liquid molecules are provided. However, these elements are omitted in the drawing for the sake of brevity. Liquid crystal 30 is dropped inside each frame-like sealing material 20 using a dispenser 50.

Figure 2A:
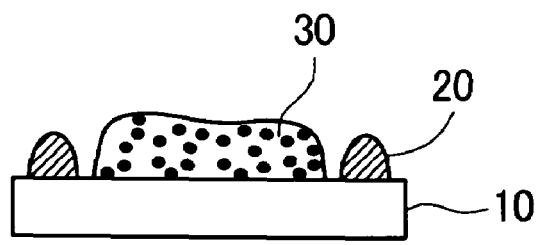
FIG. 2A is a cross-sectional view showing a state of the liquid to be sealed dropped on a back substrate in a manufacturing step of the liquid crystal display element which uses the frame-like ultraviolet curing sealing material.
Figure 2B:
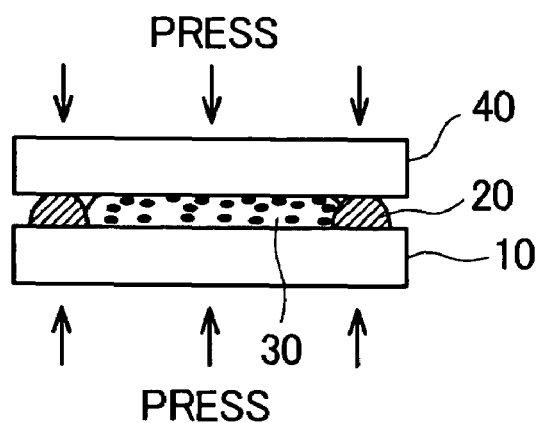
FIG. 2B is a cross-sectional view showing a state in which a back substrate and a face substrate sandwiching the liquid to be sealed are pressured to face each other in an opposed manner with a predetermined space in the manufacturing step of the liquid crystal display element which uses the frame-like ultraviolet curing sealing material.
Figure 2C:
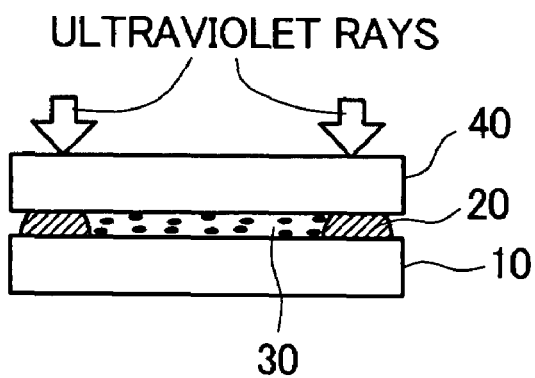
FIG. 2C is a cross-sectional view for explaining a step for fixing the face substrate and the back substrate to each other by curing the sealing material with the radiation of ultraviolet rays to the sealing material in the manufacturing step of the liquid crystal display element which uses the frame-like ultraviolet curing sealing material.

FIG. 2A is a cross-sectional view of one frame-like sealing material 20 in FIG. 1 taken along a line IIa-IIa. Taking a portion of the one sealing material 20 as an example, hereinafter, an assembling step of one liquid crystal display element is explained. FIG. 2B is a cross-sectional view showing a state of the liquid crystal display element in which another substrate 40 is overlapped to the sealing material 20 shown in FIG. 2A and liquid crystal 30 which exists inside the sealing material 20. Then, the substrates 10 and 40 are pressurized to arrange the substrate 10 and the substrate 40 to face each other in an opposed manner with a predetermined gap therebetween (although spacers or the like are used for this purpose, spacers or the like are not shown in the drawing). Next, as shown in FIG. 2C, ultraviolet rays are radiated to the sealing material 20 portion to cure the sealing material 20 thus fixedly securing the substrate 10 and the substrate 40 to each other.

Embodiment 1

Figure 3A:
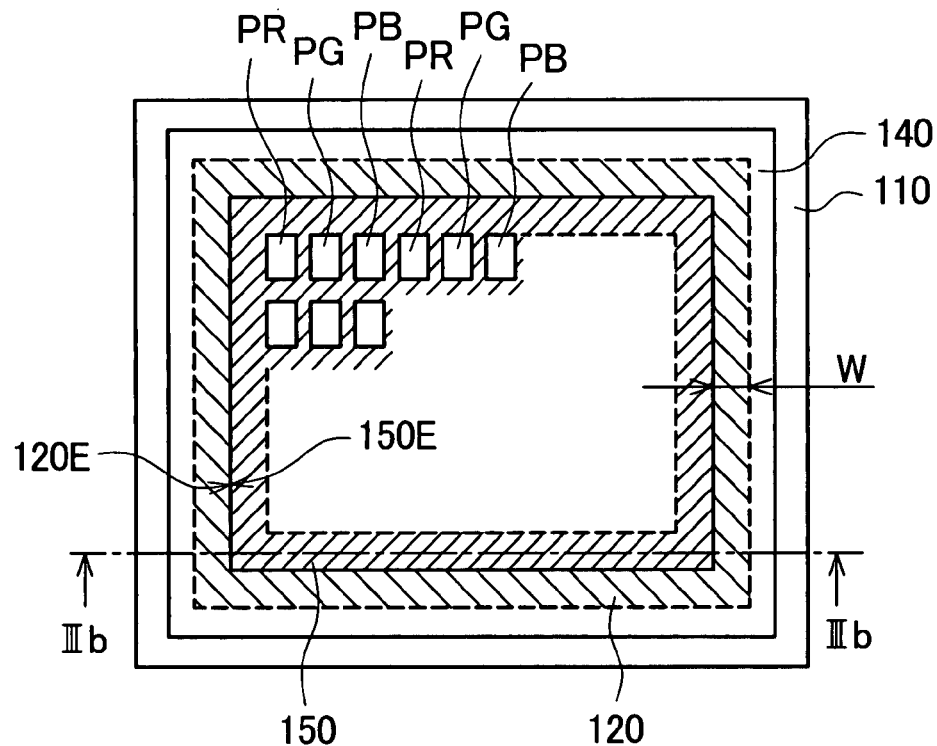
FIG. 3A is a plan view of the liquid crystal display element of the first embodiment according to the present invention.
Figure 3B:
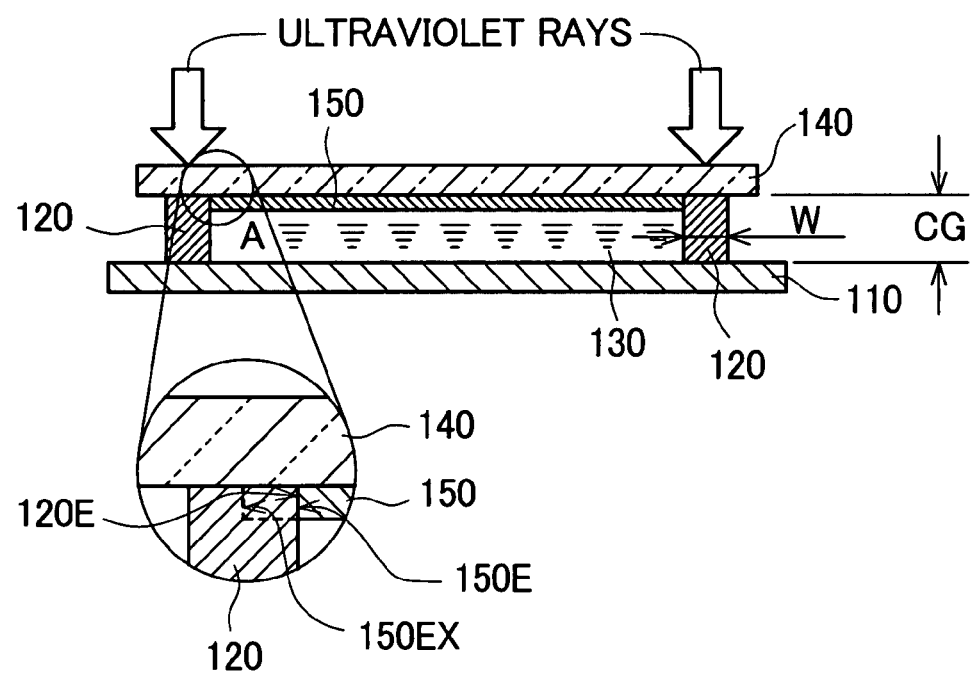
FIG. 3B is a cross-sectional view of the liquid crystal display element shown in FIG. 3A taken along the line IIIb-IIIb.

FIG. 3A is a plan view of the liquid crystal display element according to a first embodiment of the present invention, and FIG. 3B is a cross-sectional view of the liquid crystal display element shown in FIG. 3A taken along a line IIIb-IIIb. The method for sealing the liquid crystal using a dropping injection method is explained in conjunction with cross-sectional views shown in FIG. 2A and FIG. 2B which correspond to a cross-sectional view of one frame-like sealing material 20 shown in FIG. 1 taken along a line IIa-IIa. However, the cross-sectional view shown in FIG. 3B corresponds to the cross-sectional view shown in FIG. 2C.

In FIG. 3A and FIG. 3B, numeral 110 indicates a back substrate of a liquid crystal element, numeral 140 indicates a face substrate of the liquid crystal element, numeral 130 is a liquid crystal composition, numeral 120 indicates a frame-like ultraviolet curing sealing material, numeral 150 indicates a black matrix in which a large number of openings which define a profile of pixels are formed, and symbols PR, PG, PB indicate display elements of red primary color, green primary color and blue primary color which are formed in the opening portions of the black matrix 150. In FIG. 3A and FIG. 3B, for the sake of brevity, elements such as switching elements which are provided corresponding to respective pixel electrodes, electric lines, external lead electrode terminals from the switching elements and the electric lines, three primary color filters and the like formed on the substrates are omitted in the drawing.

In this embodiment, the black matrix 150 is configured such that a peripheral portion of the black matrix 150 is not overlapped to the frame-like ultraviolet curing sealing material 120 and an external periphery 150E of the black matrix 150 is merely brought into contact with (tangent to) an inner side periphery 120E of the frame-like ultraviolet curing sealing material. Accordingly, after the liquid crystal composition 130 is injected inside the frame-like sealing material 120 between the back substrate 110 and the face substrate 140 by the dropping injection method, in the same manner as explained in conjunction with FIG. 2C, as shown in FIG. 3B, when ultraviolet rays are radiated to the frame-like ultraviolet curing sealing material 120 to cure the frame-like ultraviolet curing sealing material 120, the ultraviolet rays can reach the ultraviolet curing sealing material 120 without being obstructed by the black matrix 150 and hence, the curing of the ultraviolet-curing sealing 120 is sufficiently performed thus enabling the acquisition of a highly reliable liquid crystal display element.

In the above-mentioned explanation, the explanation has been made with respect to the constitution in which the external periphery 150E of the black matrix is merely brought into contact with (tangent to) the inner periphery 120E of the frame-like ultraviolet-curing sealing material 120. However, since a width W of the frame-like ultraviolet-curing sealing material 120 (see FIG. 3A, FIG. 3B) is usually approximately 1 mm, when an overlap width of the frame-like ultraviolet-curing sealing material 120 and the black matrix 150 is 0.2 mm or less, the overlap width is allowable. The relationship of the width W and the overlap width when such an overlap exists is indicated by a bold broken line in FIG. 3B showing an A portion in an enlarged manner. That is, as shown in the drawing, the outer periphery of the black matrix 150 projects into a position indicated by symbol 150EX between the frame-like ultraviolet-curing sealing material 120 and the face substrate 140 of the liquid crystal display element.

Here, as the frame-like ultraviolet-curing sealing material 120, a sealing material having the following composition may be proposed.

80 parts by weight of epoxy acrylate of a bisphenol F epoxy resin, 20 parts by weight of RE203 (made by NIPPON KAYAKU Co., Ltd.; epoxy equivalent weight 233 g/eq, ethylene oxide added bisphenol S epoxy resin) as an epoxy resin, 1.2 parts by weight of 3,6-bis(2-methyl-2-morphlinopropionyl)-9-n-octyl carbazole (made by Asahi Denka Kogyo K.K; ADEKA OPTOMER N-1414) as radical generating photo polymerization initiator, 0.5 parts by weight of 2.2 oxybis(5,5 dimethyl-1,3,2-dioxaborinane) as boric acid ester, 0.5 parts by weight of PN-80 (made by NIPPON KAYAKU Co., Ltd.; a phenol novolac resin) and 1.3 parts by weight of amino silane coupling agent (N-β(aminoethyl)γ-aminopropyl trimethoxy silane, made by Shin-Etsu chemical Co., Ltd.; KBM-603) are heated at a temperature of 90° C. and dissolved to produce a resin liquid. After cooling the resin liquid at a room temperature, 10 parts by weight of isophtalic acid dihydrazido (product name IDH-S; made by Otsuka Chemical Co., Ltd. obtained by grinding using a jet mill and further pulverizing aground material using a jet mill of higher grinding grade, a melting point of 224° C., active hydrogen equivalent weight 48.5 g/eq, average particle size of 1.7 μm, maximum particle size of 7 μm), 13 parts by weight of alumina (made by C.I. Kasei Co., Ltd.; SPC-AI, average particle size of 1.0 μm) and 3.9 parts by weight of rubber (made by KUREHA CORPORATION; paraloid EXL-2655, average particle size of 0.2 μm) are dispersed and mixed in the resin liquid in a mill to obtain a UV sealing agent.

As a method for forming the black matrix 150, for example, there is known a method in which, for example, an organic resin such as an acrylic resin, an epoxy resin or a polyimide resin which contains carbon black or a black organic pigment is applied to the transparent glass substrate 140 by coating in a pattern shape.

Next, the optical characteristic which the frame-like ultraviolet curing sealing material 120 is required to satisfy is studied. This embodiment is configured to allow the overlapping width of the frame-like ultraviolet curing sealing material 120 and the black matrix 150 to be 0.2 mm or less and hence, it is desirable that the ultraviolet curing sealing material 120 also satisfies the optical characteristic equivalent to the optical characteristic of the black matrix 150. For example, it is desirable that the optical density OD satisfies the relationship of OD≧2.0. However, when the optical density OD is excessively large, there arises a drawback that the ultraviolet curing sealing material is not cured. The value of the optical density OD which the ultraviolet curing sealing material 120 is required to satisfy depends on a distance CG (see FIG. 3B) between the back substrate 110 and the face substrate 140 and is preferably set to following values.

| Inter-substrate distance CG(μm) | Required optical density OD |
|---|---|
| 4 | 2-3 |
| 3 | 2-3.5 |
| 2 | 2-4 |

As one example of a method for adjusting the above-mentioned optical density, there is known a method which adds a titanium-based black pigment to the ultraviolet curing sealing material. The titanium-based black pigment is described in detail in Japanese Patent Laid-open Sho58-180413.

Embodiment 2

In the above-mentioned embodiment 1, the outer periphery 150E of the black matrix 150 simply comes into contact (tangent) with an inner periphery 120E of the frame-like ultraviolet curing sealing material 120 or the overlapping width of the frame-like ultraviolet curing sealing material 120 and the black matrix 150 is set to 0.2 mm or less. In the above-mentioned embodiment 1, to impart the optical characteristic equivalent to the optical characteristic of the black matrix 150 to the ultraviolet curing sealing material 120, for example, it is necessary to sufficiently take the optical density OD into consideration. In this embodiment, the ultraviolet curing of the frame-like ultraviolet curing sealing material 120 can be sufficiently performed while positively overlapping the frame-like ultraviolet curing sealing material 120 and the peripheral portion of the black matrix 150 to each other to alleviate the conditions such as the optical density OD which the ultraviolet curing sealing material 120 is requested to satisfy.

That is, in this embodiment, while a quantity of light which passes through the frame-like ultraviolet curing sealing material 120 is reduced by overlapping the peripheral portion of the black matrix 150 to the frame-like ultraviolet curing sealing material 120, to ensure a quantity of ultraviolet rays necessary for curing the frame-like ultraviolet curing sealing material 120, an opening, a slit or the like is formed in the peripheral portion of the black matrix 150 which is overlapped to the frame-like ultraviolet curing sealing material 120 or the peripheral portion of the black matrix 150 which is overlapped to the frame-like ultraviolet curing sealing material 120 is formed of a mass of black matrix pieces which are separated like islands.

Figure 4A:
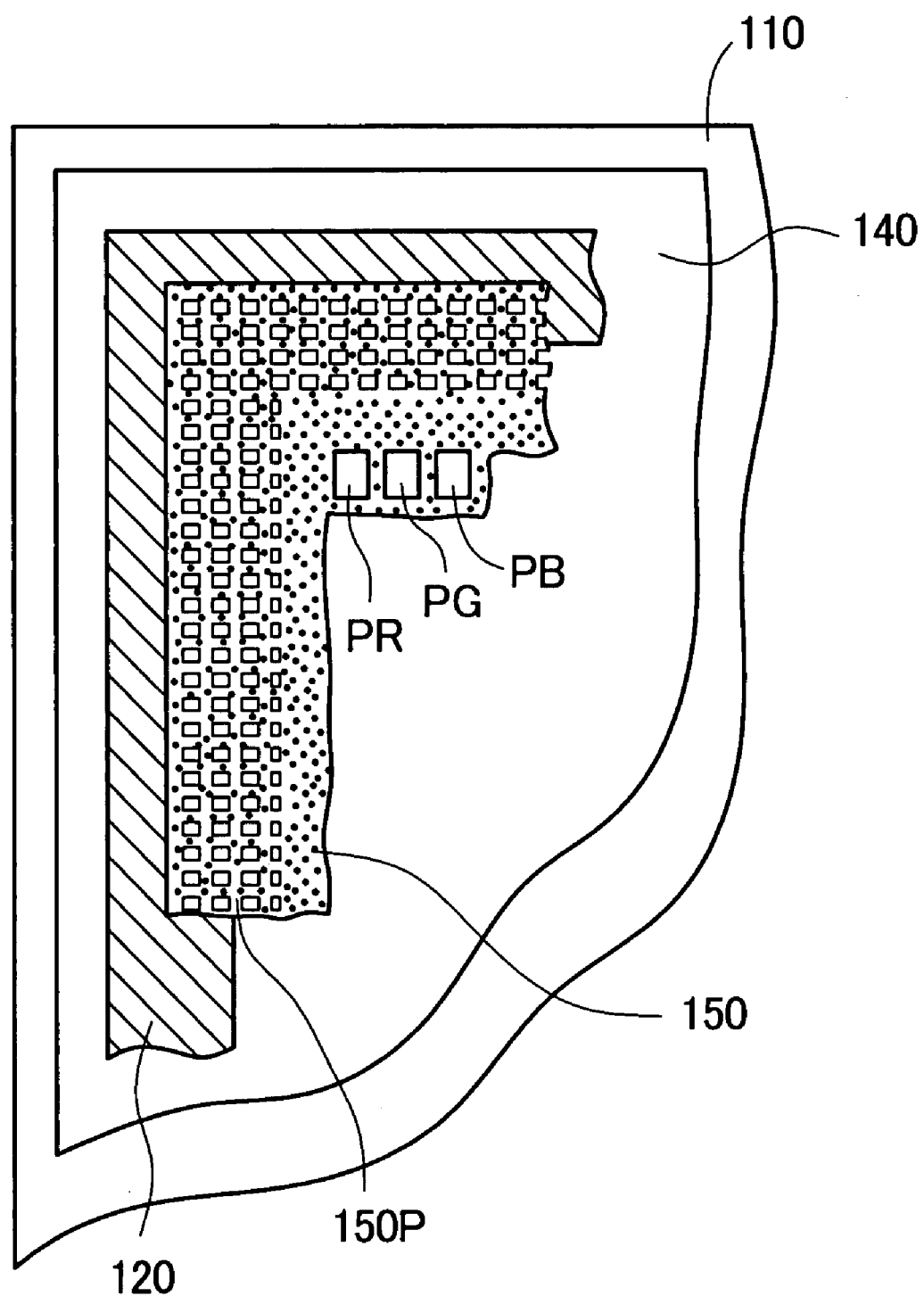
FIG. 4A is a top plan view of an essential part of the liquid crystal display element when a peripheral portion of a black matrix which is overlapped to a frame-like ultraviolet curing sealing material in the liquid crystal display element of the second embodiment according to the present invention is formed in a grid pattern.

FIG. 4A is a top plan view of an essential part of the liquid crystal display element when the peripheral portion of the black matrix 150 which is overlapped to the frame-like ultraviolet curing sealing material 120 is formed in a grid pattern 150P.

Figure 4B:
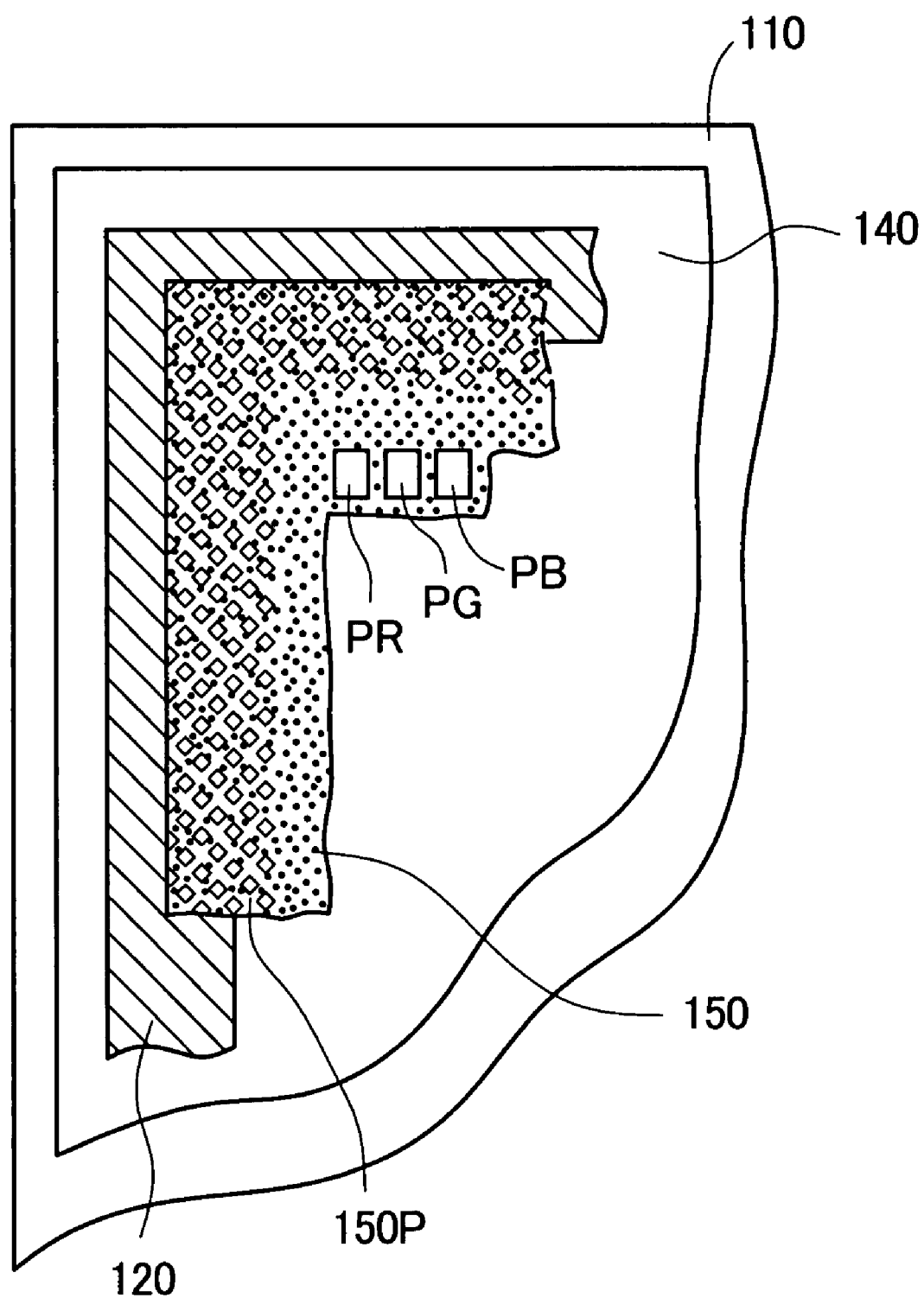
FIG. 4B is a top plan view of an essential part of the liquid crystal display element when a peripheral portion of a black matrix which is overlapped to a frame-like ultraviolet curing sealing material in the liquid crystal display element of the second embodiment according to the present invention is formed in an oblique grid pattern.

FIG. 4B is a top plan view of an essential part of the liquid crystal display element when the peripheral portion of the black matrix 150 which is overlapped to the frame-like ultraviolet curing sealing material 120 is formed in an oblique grid pattern 150P.

Figure 4C:
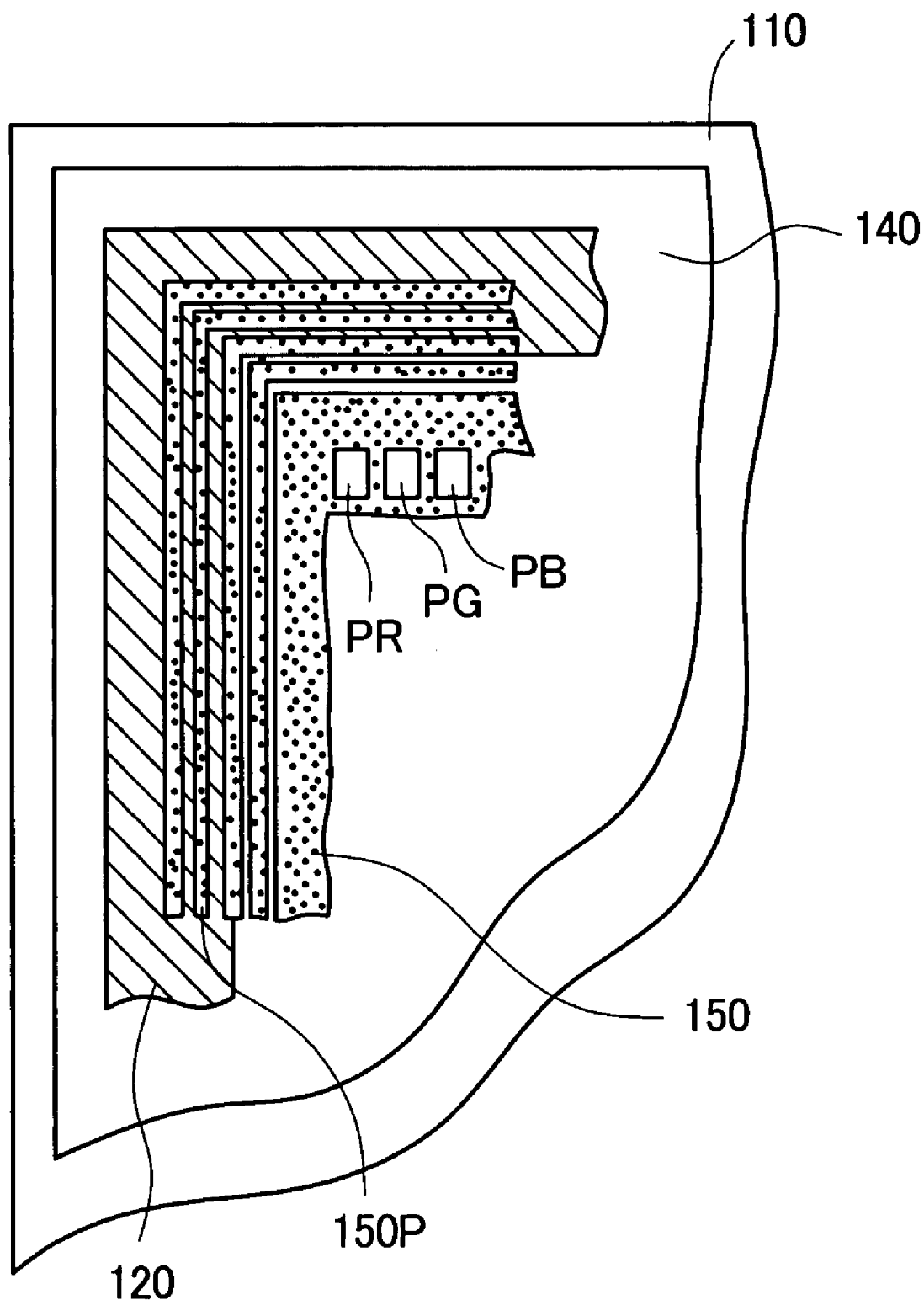
FIG. 4C is a top plan view of an essential part of the liquid crystal display element when a peripheral portion of a black matrix which is overlapped to a frame-like ultraviolet curing sealing material in the liquid crystal display element of the second embodiment according to the present invention is formed in a stripe pattern.

FIG. 4C is a top plan view of an essential part of the liquid crystal display element when the peripheral portion of the black matrix 150 which is overlapped to the frame-like ultraviolet curing sealing material 120 is formed in a stripe pattern 150P.

Figure 4D:
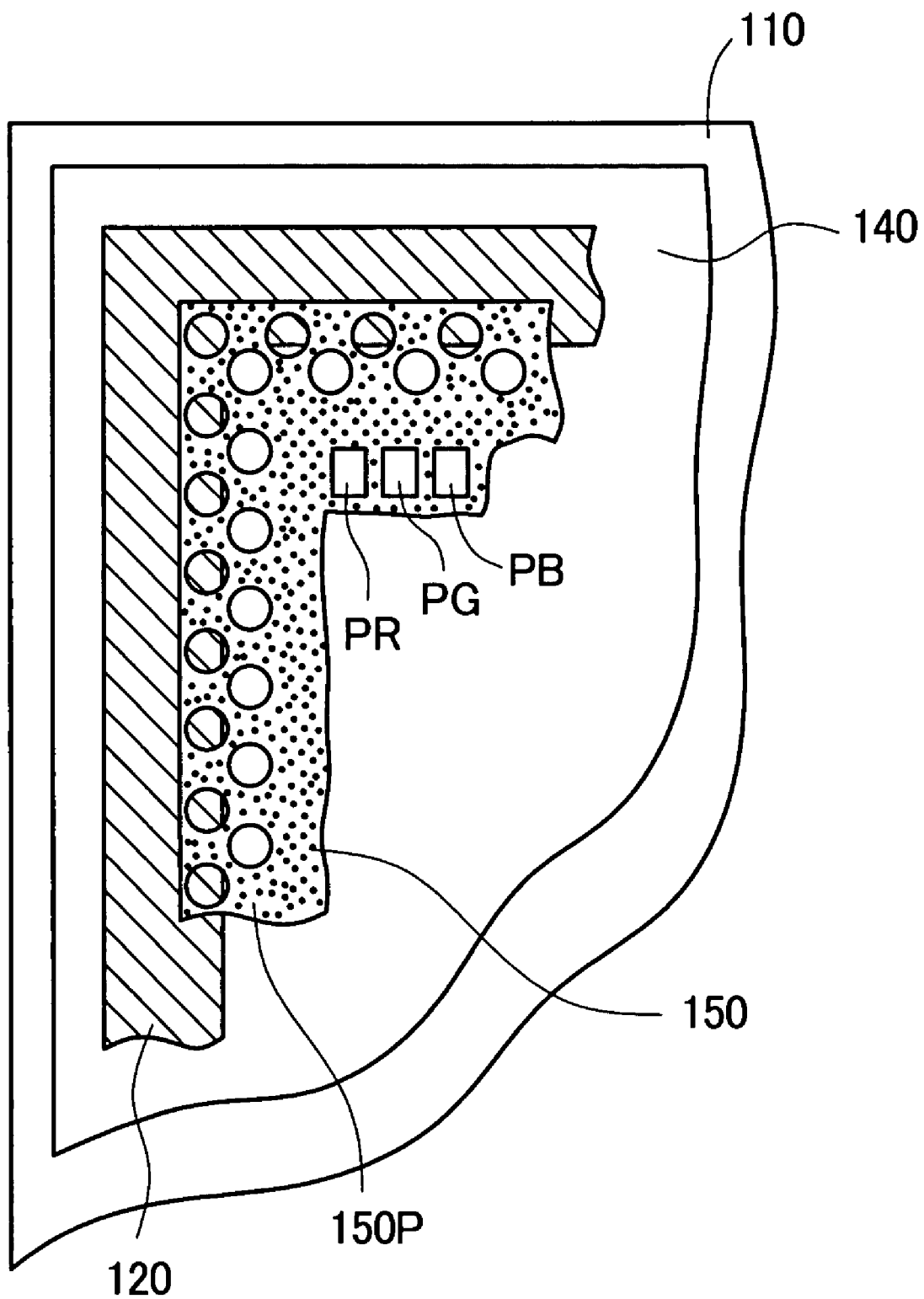
FIG. 4D is a top plan view of an essential part of the liquid crystal display element when a peripheral portion of a black matrix which is overlapped to a frame-like ultraviolet curing sealing material in the liquid crystal display element of the second embodiment according to the present invention is formed in a circular opening pattern.

FIG. 4D is a top plan view of an essential part of the liquid crystal display element when the peripheral portion of the black matrix 150 which is overlapped to the frame-like ultraviolet curing sealing material 120 is formed in a circular opening pattern 150P.

Figure 4E:
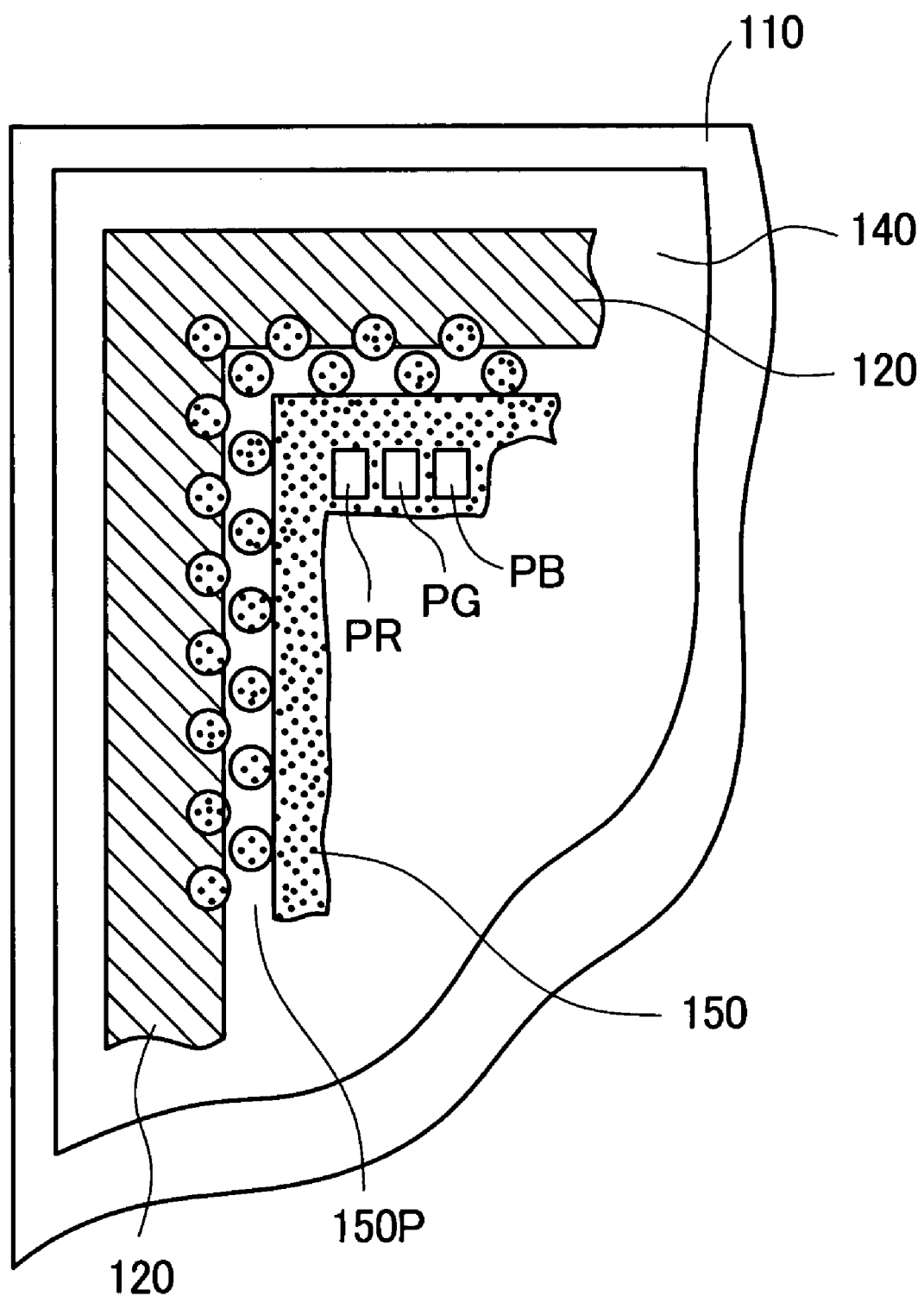
FIG. 4E is a top plan view of an essential part of the liquid crystal display element when a peripheral portion of a black matrix which is overlapped to a frame-like ultraviolet curing sealing material in the liquid crystal display element of the second embodiment according to the present invention is formed in an island pattern.

FIG. 4E is a top plan view of an essential part of the liquid crystal display element when the peripheral portion of the black matrix 150 which is overlapped to the frame-like ultraviolet curing sealing material 120 is formed in an island pattern 150P.

Figure 4F:
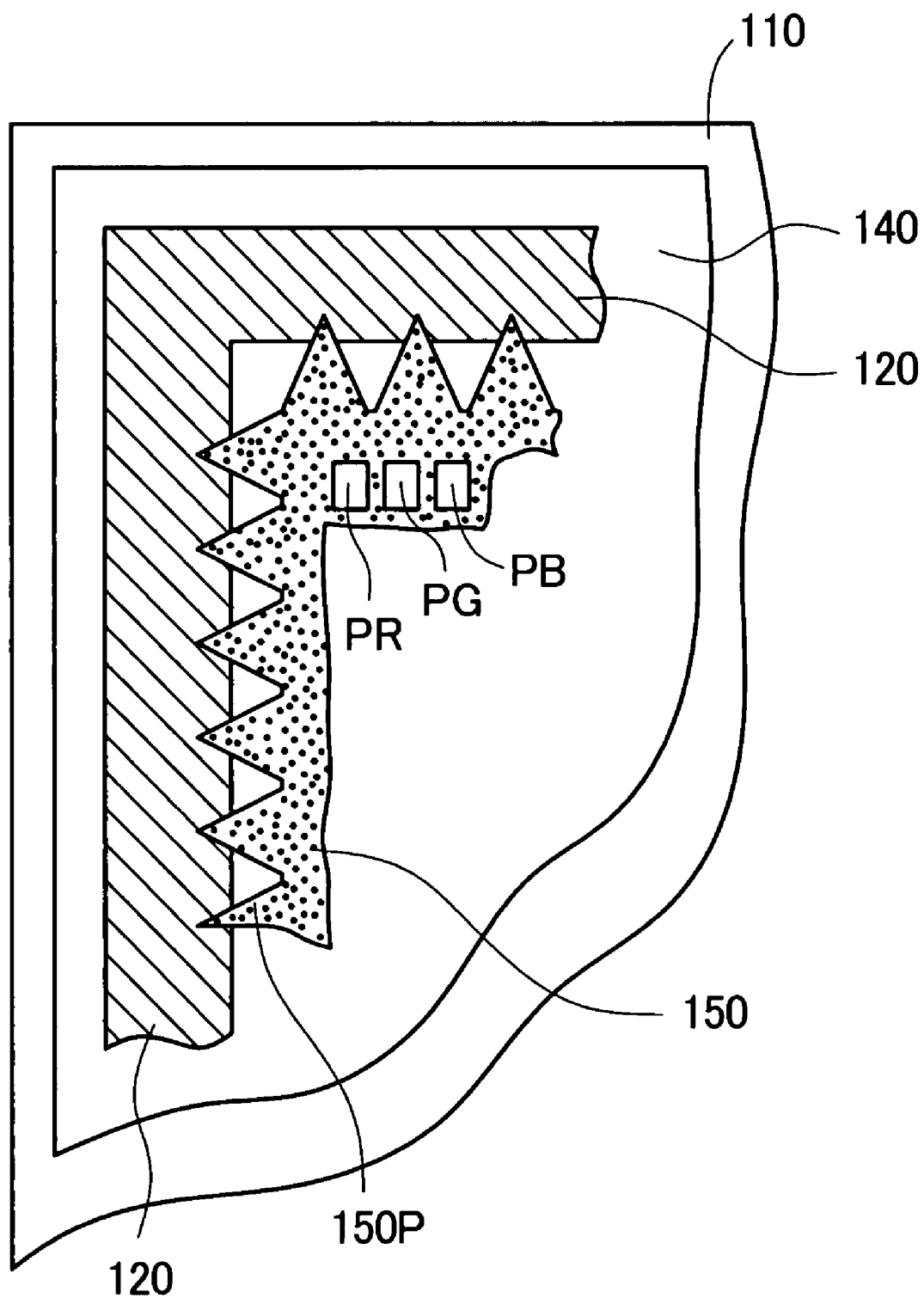
FIG. 4F is a top plan view of an essential part of the liquid crystal display element when a peripheral portion of a black matrix which is overlapped to a frame-like ultraviolet curing sealing material in the liquid crystal display element of the second embodiment according to the present invention is formed in a wedge pattern.

FIG. 4F is a top plan view of an essential part of the liquid crystal display element when the peripheral portion of the black matrix 150 which is overlapped to the frame-like ultraviolet curing sealing material 120 is formed in a wedge pattern 150P.

Here, in FIG. 4A to FIG. 4F, numeral 110 indicates a back substrate, numeral 140 indicates a face substrate, and reference symbols PR, PG and PB respectively indicate red primary color, green primary color and blue primary color.

The invention claimed is:

1. A liquid crystal display element comprising:
    a first transparent substrate;
    a second substrate which faces the first transparent substrate in an opposed manner by way of a predetermined gap therebetween;
    a frame-like sealing material which is made of an ultraviolet-ray curing material and is sandwiched between the first substrate and the second substrate;
    a liquid crystal composition sealed in a space defined inside the frame-like sealing material;
    a plurality of display pixels which are formed between the first substrate and the second substrate by a plurality of electrodes which are formed on at least one of the first substrate and the second substrate; and
    a black matrix which defines respective profiles of the plurality of display pixels and, at the same time, is made of a light blocking material which is formed to surround a display region formed of the plurality of display pixels, wherein
    an overlapping width of the frame-like sealing material and the black matrix on a peripheral portion along the display region is 0.2 mm or less, and
    wherein an overlapping width of the frame-like sealing material and the black matrix on a peripheral portion along the display region is 20% or less of a width of the frame like sealing material.

2. A liquid crystal display element according to claim 1, wherein optical density of an ultraviolet curing material which forms the frame-like sealing material before curing is between 2 and 4, and
 wherein the distance between the first substrate and the second substrate is 2 μm or more.

3. A liquid crystal display element according to claim 2, wherein optical density of an ultraviolet curing material which forms the frame-like sealing material before curing is between 2 and 3.5, and
 wherein the distance between the first substrate and the second substrate is between 2 μm and 3.5 μm.

4. A liquid crystal display element comprising:
 a first transparent substrate;
 a second substrate which faces the first transparent substrate in an opposed manner by way of a predetermined gap therebetween;
 a frame-like sealing material which is made of an ultraviolet-ray curing material and is sandwiched between the first substrate and the second substrate;
 a liquid crystal composition sealed in a space defined inside the frame-like sealing material;
 a plurality of display pixels which are formed between the first substrate and the second substrate by a plurality of electrodes which are formed on at least one of the first substrate and the second substrate; and
 a black matrix which defines respective profiles of the plurality of display pixels and, at the same time, is made of a light blocking material which is formed to surround a display region formed of the plurality of display pixels, wherein a region of the black matrix which is overlapped to the frame-like sealing material is patterned to include a light transmitting portion, and
 wherein an overlapping width of the frame-like sealing material and the black matrix on a peripheral portion along the display region is 20% or less of a width of the frame like sealing material.

5. A liquid crystal display element according to claim 4, wherein the region of the black matrix which is overlapped to the frame-like sealing material is formed in a grid pattern extending in the horizontal direction as well as in the vertical direction.

6. A liquid crystal display element according to claim 4, wherein the region of the black matrix which is overlapped to the frame-like sealing material is formed in a grid pattern inclined from the horizontal direction and the vertical direction.

7. A liquid crystal display element according to claim 4, wherein the region of the black matrix which is overlapped to the frame-like sealing material is formed in a stripe pattern.

8. A liquid crystal display element according to claim 4, wherein the region of the black matrix which is overlapped to the frame-like sealing material is formed in an opening pattern.

9. A liquid crystal display element according to claim 4, wherein the region of the black matrix which is overlapped to the frame-like sealing material is formed in an island pattern.

10. A liquid crystal display element according to claim 4, wherein the region of the black matrix which is overlapped to the frame-like sealing material is formed in a wedge pattern.

\* \* \* \* \*